(12) United States Patent
Robertson

(10) Patent No.: US 6,293,800 B1
(45) Date of Patent: Sep. 25, 2001

(54) EDUCATIONAL AND ENTERTAINMENT DEVICE

(76) Inventor: John Robertson, 8710 S. 78th Ave., Bridgeview, IL (US) 60455

( * ) Notice: Subject to any disclaimer, the term of this patent is extended or adjusted under 35 U.S.C. 154(b) by 0 days.

(21) Appl. No.: 09/311,504

(22) Filed: May 13, 1999

(51) Int. Cl.$^7$ .................................................. G09B 1/00
(52) U.S. Cl. ..................... 434/196; 273/441; 446/485; 446/117; 446/168
(58) Field of Search .................... 434/159, 198, 434/160, 335; 446/485, 117, 168; 273/441, 440, 443, 90, 153 P, 153 S

(56) References Cited

U.S. PATENT DOCUMENTS

| | | |
|---|---|---|
| 2,726,869 | 12/1955 | Schulte . |
| 2,838,870 | 6/1958 | Morse . |
| 2,931,131 | 4/1960 | Morse . |
| 3,028,704 | 4/1962 | Rumbaugh . |
| 4,657,255 * | 4/1987 | Seres ..................................... 273/113 |
| 4,861,036 * | 8/1989 | Watanabe .............................. 273/113 |
| 6,074,212 * | 6/2000 | Cogliano .............................. 434/159 |

FOREIGN PATENT DOCUMENTS

| | | |
|---|---|---|
| 1 804 326 | 1/1970 | (DE) . |
| 2 335 624 | 9/1974 | (DE) . |
| 1405105 | 9/1975 | (GB) . |
| 94/26372 | 11/1994 | (WO) . |

* cited by examiner

Primary Examiner—Joe H. Cheng
Assistant Examiner—Kathlen M. Christman
(74) Attorney, Agent, or Firm—Wood, Phillips, VanSanten, Clark & Mortimer

(57) ABSTRACT

An educational and entertainment device includes n layers stackable in a predetermined order one on top of the other to define a tower having n layers. The xth layer, where x varies between 1 and n, is divided into x sections, at least one of the x sections of the xth layer having a passage segment formed therethrough such that with the n layers stacked one on top of the other in the predetermined order, the passage segments of the n layers are in communication with each other to define a passage which extends through the tower. The device also includes an indicator element passable through the passage to confirm that the n layers have been assembled in the predetermined order.

12 Claims, 4 Drawing Sheets

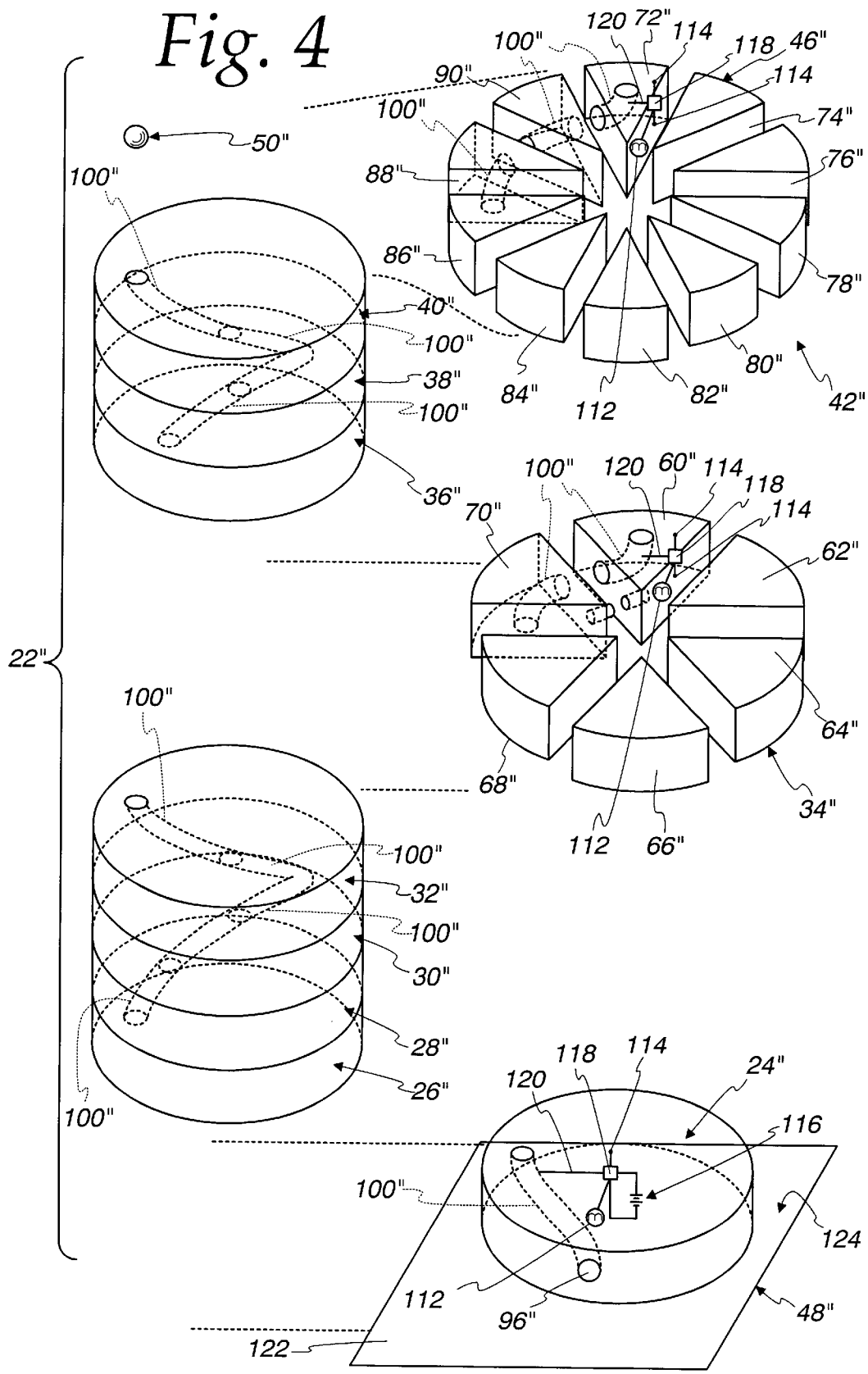

EDUCATIONAL AND ENTERTAINMENT DEVICE

FIELD OF THE INVENTION

The present invention is directed to an educational and entertainment device, and in particular to an educational and entertainment device used to teach fractions.

BACKGROUND OF THE INVENTION

It is common to teach mathematical operations and principles by representing concepts graphically. For example, a common graphical device used to teach fractions is the pie chart, i.e., a circle or pie which has been divided or cut into an equal number of pieces or slices, each piece or slice representing a section or fraction of the total circle or pie. To teach several different fractions (halves, thirds, fourths, etc.), several different pie charts may be used.

However, while such graphical representations may initially interest students, it does not take long for some students' attention to wander. The pie chart may not provide the physical stimulation or reinforcement which some students need to maintain their attention on the concept being taught. Rather than being challenging, repetitious drills with the pie chart may become tedious and even frustrating.

It is therefore an object of the present invention to provide an educational device which makes learning about fractions fun.

It is also an object of the present invention to provide an education device which provides the student with an opportunity to appreciate fractions on a physical as well as intellectual level.

It is a further object of the present invention to provide an education device which provides multiple levels of challenge.

SUMMARY OF THE INVENTION

According to an aspect of the present invention, an educational and entertainment device includes n layers stackable in a predetermined order one on top of the other to define a tower having n layers. The xth layer, where x varies between 1 and n, is divided into x sections, at least one of the x sections of the xth layer having a passage segment formed therethrough such that with the n layers stacked one on top of the other in the predetermined order, the passage segments of the n layers are in communication with each other to define a passage which extends through the tower. The device may also include an indicator element passable through the passage to confirm that the n layers have been assembled in the predetermined order.

BRIEF DESCRIPTION OF THE DRAWINGS

FIG. 4 is a partially exploded, perspective view of still another educational and entertainment device according to the present invention incorporating audio or visual signal devices to confirm that the predetermined assembled order of the section and layers has been established so as to define a passage which an indicator element may pass through.

DETAILED DESCRIPTION OF THE PREFERRED EMBODIMENT

Figure 1:
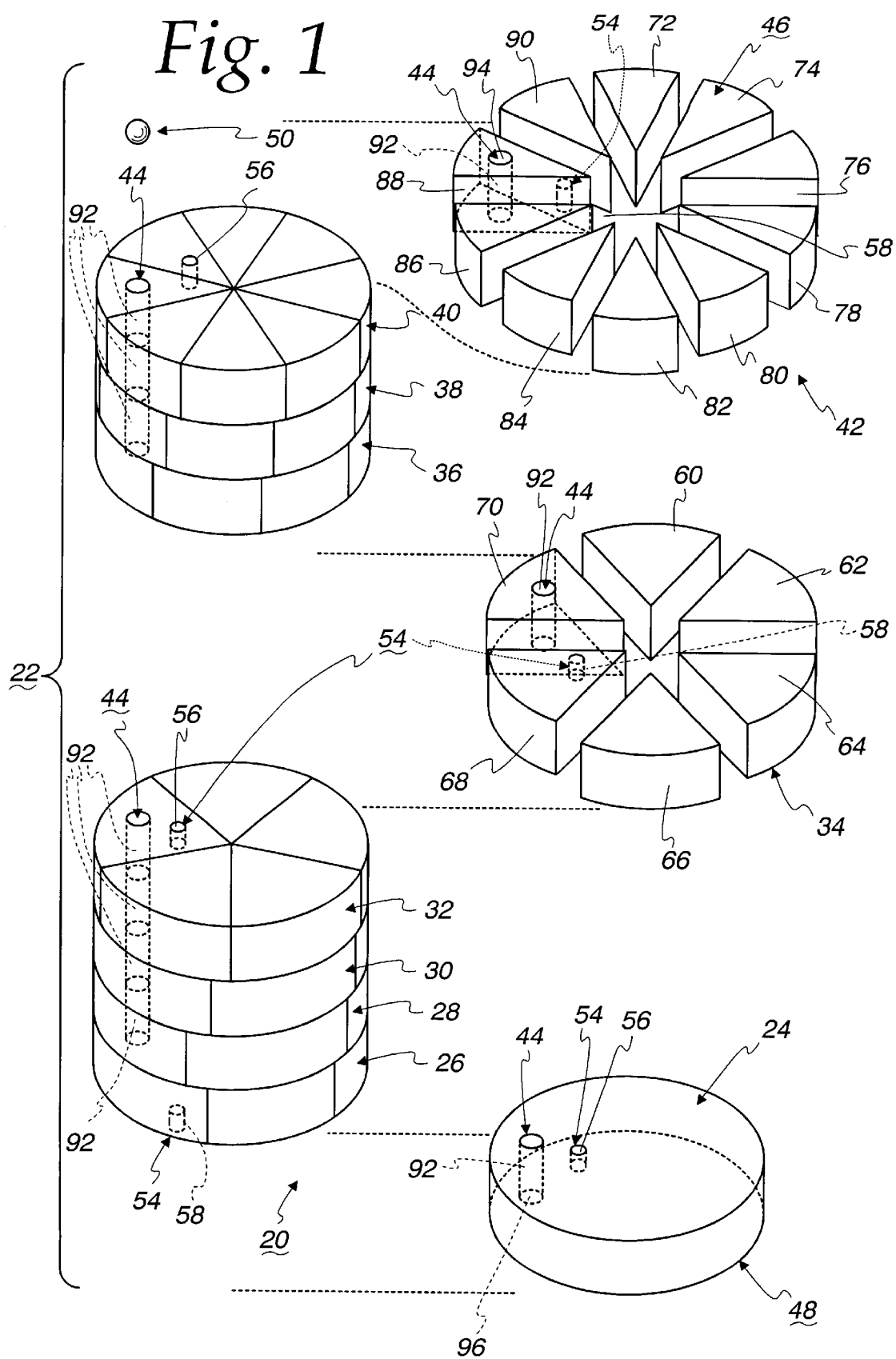
FIG. 1 is a partially exploded, perspective view of an educational and entertainment device according to the present invention with multiple layers each defined by one or more sections which, in a predetermined assembled order, define a passage therethrough.

FIG. 1 shows a first embodiment of the present invention for an educational and entertainment device 20. The educational and entertainment device 20 includes a tower 22 having layers 24, 26, 28, 30, 32, 34, 36, 38, 40, 42. A passage 44 is formed through the layers 24–42 of the tower 22 from the upper end 46 to the lower end 48. The educational and entertainment device 20 may also include an indicator element 50 which may be disposed in the passage 44 to provide an indication whether the layers 24–42 have been assembled in a correct orientation relative to each other.

As indicated above, the tower 22 consists of ten layers 24–42. The educational and entertainment device 20 is not limited to a tower 22 having only ten layers 24–42. Ten layers 24–42 are used so that fractions from one-half to one-tenth might be represented by the layers 26–42 of the tower 22. If it is desirable to represent fractions smaller than a tenth, then additional layers could be added to the tower 22.

Figure 2:
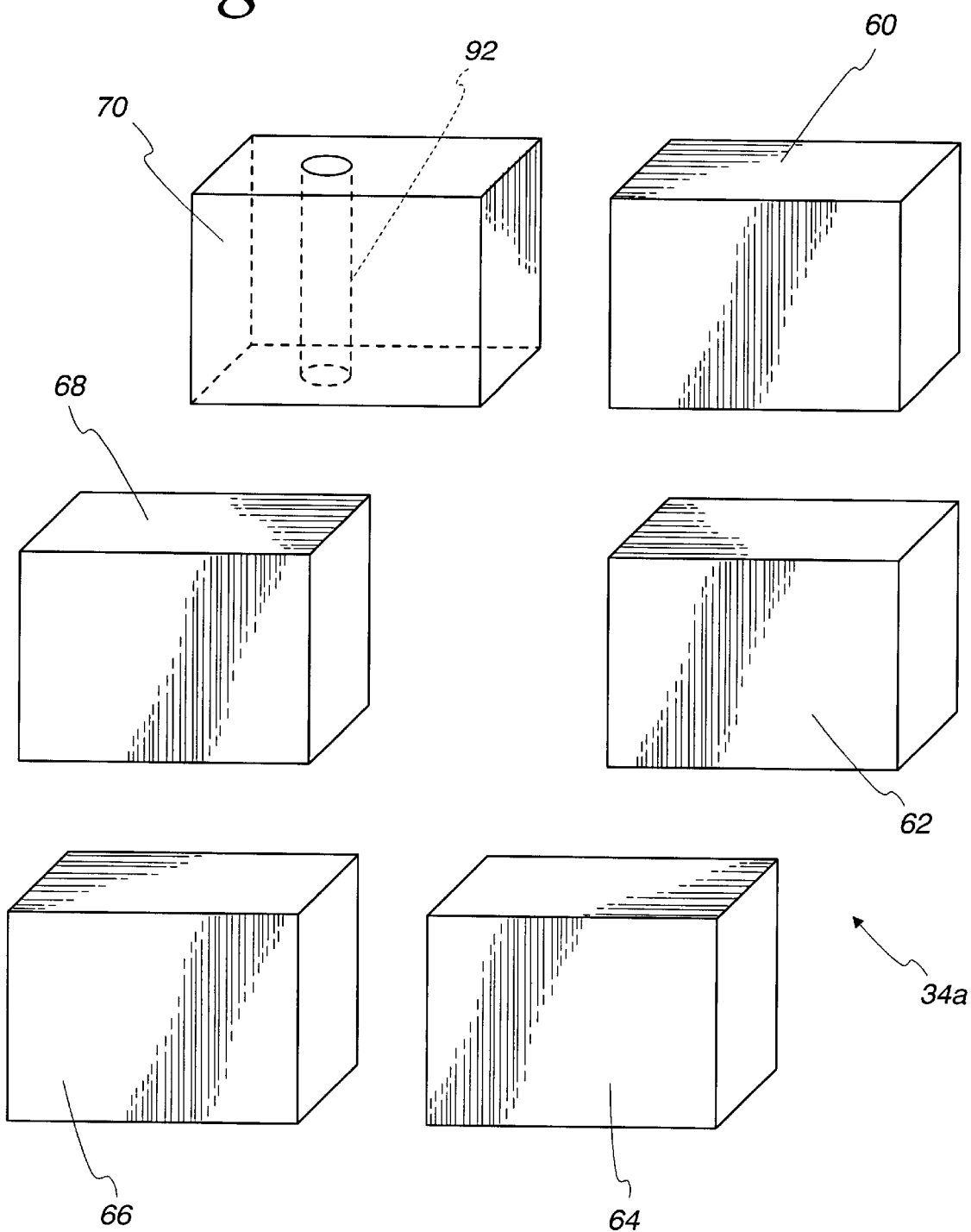
FIG. 2 is an exploded, perspective view of an alternative layer for the educational and entertainment device shown in FIG. 1.

While the shape of each of the layers 24–42 shown in FIG. 1 is roughly cylindrical, the present invention is not limited to the cylindrical shape. For example, the layers 24–42 could have a triangular, square, or hexagonal cross section. FIG. 2 shows an alternative layer 34a having a square cross section.

The layers 24–42 may be made from any of a number of materials. Preferably, the layers 24–42 are made of a plastic which has good strength and durability characteristics. The plastic may be transparent, translucent, or opaque, and the individual layers 24–42 may have a variety of colors, preferably each layer 24–42 having a different color. Alternatively, materials such as wood, paper, or cardboard may be used to make the layers 24–42. As still further alternatives, metals and ceramics may be used to form the layers 24–42.

The layers 24–42 may be stacked one on top of the other without any connection or attachment between layers 24–42.

Alternatively, a male-female connector pair 54 may be provided as shown in FIG. 1, with a female connector 56 disposed in the layer 32 and a male connector 58 extending from the layer 34. Additional female and male connectors 56, 58 have been shown for layers 24, 26 and 40, 42. The male-female connector pairs 54 may be in the nature of a snap connector or other tight fitting male-female connector.

As a further alternative, magnets of different polarities may be disposed on or in adjacent layers 24–42 to connect the layers 24–42 together.

A still further alternative is to provide a frame in which the various layers 24–42 of the tower 22 would be disposed during the assembly process, the frame providing external support to maintain the layers 24–42 together in a predetermined manner. Such a frame may have a wall which substantially conforms to the shape of the layers 24–42, or which contacts the layers 24–42 only at specific locations about their periphery.

Each of the layers 24–42 is divided into a number of sections. The number of sections into which the layer is divided is preferably determined by its position among the layers 24–42 defining the tower 22. That is, the xth layer of the tower 22 has x sections, where x varies from 1 to n, n being the total number of layers in the tower 22 (as shown, n=10).

For example, as shown in FIG. 1, layer 24 is the first layer in the tower 22. Consequently, layer 24 is a single unit. By contrast, layer 34 is the sixth layer in the tower counting from the lower end 48, and thus has six sections 60, 62, 64, 66, 68, 70. Similarly, the tenth layer 42 has 10 sections 72, 74, 76, 78, 80, 82, 84, 86, 88, 90.

Each of the layers 24–42 of the tower 22 has a passage segment 92 disposed therethrough. With all of the layers 24–42 stacked one on top of each other with the proper orientation relative to each other, the passage segments 92 align to form the passage 44. If the layers 24–42 are aligned, the when the indicator element 50 is disposed into the passage 44 through an inlet 94 at the upper end of the 46 of the tower 22, the indicator element 50 will pass through the passage 44 to an outlet 96 in the lower end 48 of the tower 22. If the layers 24–42 are not aligned properly relative to each other in a predetermined fashion, then when the indicator element 50 is disposed into the inlet 94, the indicator element 50 will not pass through to the lower end 48 to the outlet 96. Instead, it will be necessary to disassemble the tower 22 to determine where the indicator element 50 stopped, and which layers 24–42 must be reassembled in the correct order.

The indicator element 50 shown is in the shape of a sphere, such as a marble or ball bearing. Once the sections of each of the layers 24–42 have been assembled in a predetermined order necessary to shape the passage 44, 98, the indicator element 50 may be introduced at the inlet 94 and allowed to roll through the passage 44, 98 to the outlet 96, provided the layers 24–42 have been assembled properly.

The present invention is not limited to a spherical indicator element 50, however. Instead, a string, strap, cord, or rod may be inserted into the passage 44, 98 in accordance with the shape and size of the passage 44, 98. In such case, the indicator element 50 may be forced through the passage 44, 98, or it may have a weight attached to one end, the weight moving under the influence of gravity through the passage 44, 98 from the inlet 94 to the outlet 96. Once again, the use of such an indicator element 50 would be instrumental in verifying that the layers 24–42 have been assembled in the desired predetermined order and orientation relative to each other.

Figure 3:
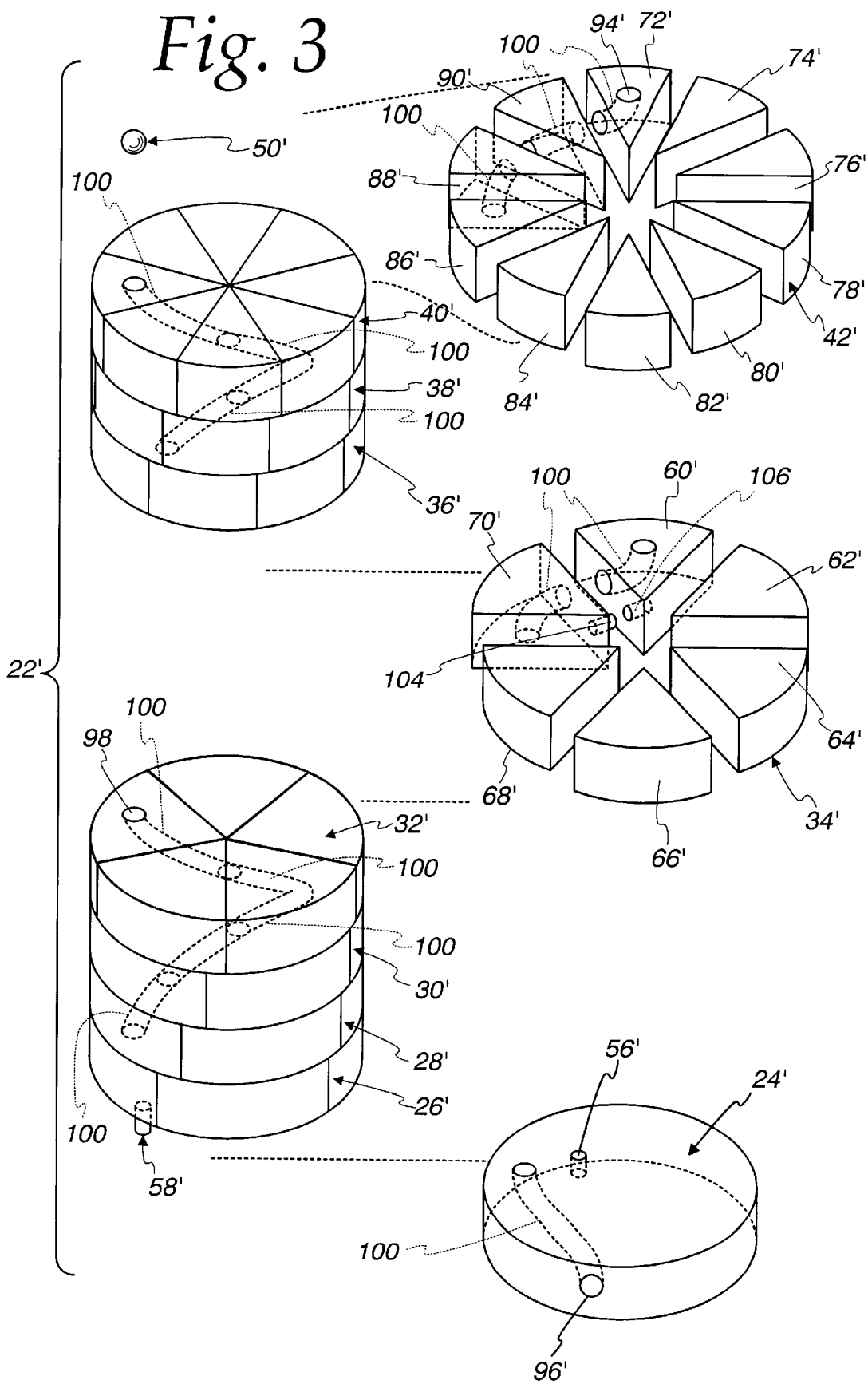
FIG. 3 is a partially exploded, perspective view of another educational and entertainment device according to the present invention having a different shaped passage than the educational and entertainment device shown in FIG. 1.

While a generally linear passage 44 has been shown in the tower 22, the present invention is not limited to the vertical, linear passage 44. For example, a second embodiment of the present invention is shown in FIG. 3 with elements similar to those in FIG. 1 numbered similarly but with a "'" designation. The embodiment shown in FIG. 3 differs from that shown in FIG. 1 in that the tower 22' has a spiral passage 98 rather than the linear passage 44. Thus, the indicator element 50' travels in a path through the layers 24'–42' of the tower 22' which is neither vertical nor linear as it passes from the inlet 94' to the outlet 96'. Other non-vertical (e.g. diagonal) and non-linear passages (e.g. curved or arcuate) are also encompassed within the present invention.

Additionally, while the passage 98 is similar to the passage 44 in that the passage 98 is made up of a plurality of passage segments 100, the passage segments 100 differ from the passage segments 92 in that each layer 24'–42' may have more than one passage segment 100. For example, the layer 34' has two passage segments 100, one each in the sections 60', 70'. Similarly, the layer 42' has three passage segments 100, disposed in the layers 72', 88', 90'.

As a consequence, when assembling the tower 22' of FIG. 3, it is important not only to arrange the layers 24'–42' such that the layers 24'–42' are in the appropriate orientation relative to each other, but it is also important that the sections are assembled in the appropriate orientation relative to each other. For example, it would be inappropriate to interpose the section 76' in between the sections 88', 90' of the layer 42' shown in FIG. 3. By interposing the section 76' between the sections 88', 90', the indicator element 50' would not be able to pass from the inlet 94' to the outlet 96'.

As shown, the passages 44, 98 have a circular cross-section. The present invention, however, is not limited to a passage 44, 98 with a circular cross-section. When the indicator element 50, 50' is in the shape of a sphere, such as a marble or ball bearing, the passage 44, 98 of circular cross-section allows for the indicator element 50, 50' to smoothly roll through the tower layers 24–42, 24'–42' of the tower 22, 22'. A similar outcome could be achieved, however, even if the passages 44, 98 had a cross section which was square or hexagonal, provided that the cross sectional area of the passage 44, 98 was greater than the cross-sectional area of the indicator element 50, 50'.

As was the case with the layers 24–42, connectors 56', 58' may be provided to attach the layers 24'–42' together before assembling the layers 24'–42' to form the tower 22', although it is not necessary to provide such connectors. Additionally, a male-female connector pair 104, 106 between the sections 60', 70' of the layer 34' has been shown. The male-female connector pair 104, 106 may be in the nature of a snap connector, although the present invention is not limited to a connector pair 104, 106 having a "snap-tight" fit as a friction fit or even loose fit may be acceptable. Alternative connectors, such as oppositely polarized magnets, may also be used to attach the sections together. Furthermore, a band may be placed about the sections of the layers 24'–42' to hold the sections together during the assembly of the tower 22'. Connections between the sections (for example, 60'–70' or 72'–90') would make the tower 22' more rigid, and less likely to topple if a force is applied to the tower 22', and may be incorporated into the other embodiments discussed herein.

A further alternative embodiment of the present invention is shown in FIG. 4 with elements corresponding to those in FIG. 3 numbered similarly but with a "''" designation. The sections of each of the layers 24"–42" of the tower 22" in FIG. 4 are made of a transparent or translucent material, such as a plastic, which may or may not have a color or tint. The transparent or translucent nature of the material of the layers 24"–42" allows for better visualization of the travel of the indicator element 50" through the layers 24"–42" of the tower 22" and for simplifying the process of locating the indicator element 50" in the tower if the indicator element 50" does not exit the tower 22" . The lines showing the different sections of the layers 26"–32" and 36"–40" have been omitted to simplify the drawing, but it is understood that each of these layers 26"–32", 36"–40" would be divided into a number of sections corresponding to position the layer 26"–32", 36"–40" relative to the first layer 24" as explained above. That is, the section 26" would be divided into halves, the section 28" would be divided into thirds, and so on.

At least one section of each layer 24"–42" has a visual or audio signal device 112 (for example a light) embedded, implanted, encased or housed in one of the sections of the layers 24"–42". Exemplarily, the signal devices 112 have been shown housed in the layer 24" and the sections 60", 72" of the layers 34", 42", respectively.

While each signal device 112 may be powered by a separate power source, preferably the signal devices 112 are connected to each other via a series of connectors 114. This arrangement allows a central power source 116 (such as a battery) to power all of the signal devices 112 once the layers 24"–42" have been assembled in the proper orientation. While the power source 116 is shown housed in the layer 24", it could be housed in another layer, such as the layer 34". However, the layer 24", being unitary in nature, affords the largest volume for holding the power source 116.

Each of the signal devices 112 is coupled to a switch 118 which has a trigger 120 disposed adjacent to one of the passage segments 92", 100". The switches 118 operate to activate the signal devices 112 when the indicator element 50" passes through the passage segment 92", 100" associated with the switch 118. The switch 118 may be designed either to activate the signal device 112 until reset, or to activate the signal device 112 only when the indicator element 50" is in contact with the trigger 120.

While lights have been shown as the signal devices 112 in the embodiment of the present invention in FIG. 4, other signal devices providing either a visual or an audio indication of the passage of the indicator element 50" through the passage 44", 98" may be provided. For example, a buzzer, clicker or other sound generator may be used.

The method of assembly and use of the present invention is now explained with reference to the educational and entertainment device 20" shown in FIG. 4, although the comments provided herein are generally applicable to all of the embodiments described herein. The first layer 24" is placed on a surface, preferably a flat surface. In fact, a platform 122 may be provided with the educational and entertainment device 20" having a planar surface 124 on which the layer 24" may be disposed. The sections (for example, 60"–70" and 72"–9") of each of the layers 26"–42" may then be assembled to form the individual layers 26"–42", with the predetermined order between the sections being maintained so that the sections (for example, 60", 70" and 72", 88", 92") with the passage elements 100" are aligned without creating an obstruction within the layers 24"–42" which would prevent the indicator element 50" from traveling through the passage 98". For example, the section 62" in layer 34" should not be assembled between the sections 60", 70", or the passage elements 100" will not be aligned, and an obstruction in the passage 98" will be formed in the layer 34". The layers 26"–44", once assembled, may then be disposed one on top of the other on top of the layer 24" to define the tower 22", with care taken to ensure that the layers 24"–42" are in their predetermined order so that the passage elements 100" are aligned between adjacent layers 24"–42".

By assembling the sections of the layers 26"–42" of the tower 22" in the predetermined order described above so that the indicator element 50" is able to travel from the inlet 94" to the outlet 96", a user, typically a student, is learning the fundamentals of fractions. For example, by seeing that the sections of the layer 28" (which are divided into thirds) cannot be combined with the sections of the layer 30" (which are divided into fourths) into a single layer, the student learns that thirds are not combinable with fourths to create a whole. By studying the predetermined order in which the sections of the various layers 26"–42" fit together, the student appreciates that sections of the layer 28" are combinable with other sections of the layer 28" to create a whole, in the same fashion that sections of the layer 30" are combinable with other sections of the layer 30" to create a whole, and so on. The student may be guided in the learning process by color-coding each layer differently, as suggested above, so that it is more visually apparent which sections belong with which other sections.

The student may be further guided in the learning process to come to further understandings about fractions through the combination of the sections of the layers 26"–42" in different predetermined orders than that described above. For example, instead of the predetermined order wherein all sections of one of the layers 26"–42" are combined together to create the layers 26"–42", the student may combine particular sections of one of the layers 26"–42" with particular sections of another of the layers 26"–42" to create a whole. Specifically, a supervisor, such as a teacher, may instruct the student to substitute four of the sections of layer 38" (which is divided into eighths) for two of the sections of layer 30" (which is divided into quarters), or to substitute three of the sections of layer 40" (which is divided into sixths) for one of the sections of layer 28" (which is divided into thirds). In doing so, the student should come to appreciate that some fractions, like some sections, are interchangeable. Similarly, the supervisor might suggest that two sections of the layer 30" be substituted for two of the sections of the layer 32" (which is divided into fifths), to highlight the point that not all sections (or fractions) are not interchangeable (i.e., that two quarters do not equal two fifths).

The only limitation on the substitutions possible is that the sections which have the passage segments 100" for the layers 26"–42" must be combined together in the same order as described above, or obstructions will be created in the passage 98, which leads to the second level of education provided by the educational and entertainment device 20". In addition to teaching the student about fractions, the device 20" requires a certain degree of hand-to-eye coordination and spatial perception. It is only through a combination of an understanding of fractions and this coordination/perception that the goal of assembling the sections and the layers 24"–42" in the predetermined order may be achieved.

Once the sections and layers 24"–42" have been arranged in their predetermined order, the indicator element 50" may be placed in the inlet 94" and passed through the passage 98" to the outlet 96", where it exits the tower 22" onto the surface 124 of the platform 122. The visual reward and stimulation provided by seeing the indicator element 50" travel through the passage 98" on successful completion of the assembly process is thought to positively impact the learning experience by adding an element of fun and entertainment. The fun and entertainment is enhanced through the addition of the signal devices 112, which are activated as the indicator element 50" travels through the passage 98".

Still other aspects, objects, and advantages of the present invention can be obtained from a study of the specification, the drawings, and the appended claims.

I claim:

1. An educational and entertainment device comprising:

n layers stackable in a predetermined order one on top of the other to define a tower having n layers each with a perimeter shape, with the perimeter shape of at least one of the n layers being substantially the same as the perimeter shape of another of the n layers that is on top of the one of the n layers; and the xth layer, where x varies between 1 and n, being divided into x sections, at least one of the x sections of the xth layer having a passage segment formed therethrough such that with the n layers stacked one on top of the other in the predetermined order, the passage segments of the n layers are in communication with each other to define a passage which extends through the tower.

2. The educational and entertainment device according to claim 1, wherein the xth layer is divided into x sections which are assembled in a predetermined order, the passage segments of the n layers being in communication with each other to define the passage with the x sections of each layer assembled together in their predetermined order and the n layers stacked one on top of the other in their predetermined order.

3. The educational and entertainment device according to claim 1, wherein the at least one of the x sections of the n layers further comprises:

an electrical signal device coupled to the connector, the electrical connectors of the n layers coupled to each other with the n layers stacked in the predetermined order; and a switch adjacent the passage segment and coupled to the electric signal device, the switch capable of activating the signal device when an indicator element is passed through the passage to confirm that the predetermined order of the layers has been established so as to define the passage.

4. The educational and entertainment device according to claim 3, wherein the first layer comprises a battery coupled to the electrical connector.

5. The educational and entertainment device according to claim 3, wherein the signal device is a light.

6. The educational and entertainment device according to claim 1, wherein the passage comprises a spiral passage.

7. The educational and entertainment device according to claim 1, further comprising an indicator element passable through the passage to confirm that the n layers have been assembled in the predetermined order.

8. The educational and entertainment device according to claim 7, wherein the indicator element is a sphere.

9. The educational and entertainment device according to claim 8, wherein the indicator element is a marble-sized sphere.

10. The educational and entertainment device according to claim 1 wherein the at least one and the another of the n layers have a perimeter dimension, and the perimeter dimensions of the at least one and the another of the n layers are substantially the same.

11. The educational and entertainment device according to claim 1 wherein n is equal to at least three and each of the three layers has a perimeter dimension and the perimeter shapes and dimensions of each of the three layers are substantially the same.

12. An educational and entertainment device comprising:

n layers stackable in a predetermined order one on top of the other to define a tower having n layers each with a perimeter shape, the xth layer, where x varies between 1 and n being divided into x sections; and wherein n is equal to at least three and each of the three layers has a perimeter dimension and the perimeter shapes and dimensions of each of the three layers are substantially the same.

* * * * *